(12) United States Patent
Mano et al.

(10) Patent No.: US 6,229,721 B1
(45) Date of Patent: May 8, 2001

(54) HIGH VOLTAGE POWER SUPPLY APPARATUS

(75) Inventors: Hiroshi Mano; Takuya Mukaibara, both of Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/258,207

(22) Filed: Feb. 26, 1999

(30) Foreign Application Priority Data

Feb. 27, 1998 (JP) .................................................. 10-047417

(51) Int. Cl.$^7$ ........................... H02H 7/122; H02H 3/335
(52) U.S. Cl. ................................................. 363/56; 363/21
(58) Field of Search ........................... 363/56, 53, 50, 363/21; 323/222, 282, 288, 9

(56) References Cited

U.S. PATENT DOCUMENTS

| 3,805,142 | * | 4/1974 | Rando ....................................... 363/53 |
| 4,422,138 | * | 12/1983 | Kornrumpf ................................ 363/21 |
| 5,216,352 | * | 6/1993 | Studtmann et al. ...................... 323/241 |
| 5,262,932 | * | 11/1993 | Stanley et al. ............................ 363/26 |
| 5,268,631 | * | 12/1993 | Gorman et al. .......................... 323/246 |
| 5,285,780 | * | 2/1994 | Tsuji et al. ............................... 607/13 |

\* cited by examiner

*Primary Examiner*—Peter S. Wong
*Assistant Examiner*—Rajnikant D. Patel
(74) *Attorney, Agent, or Firm*—Fitzpatrick, Cella, Harper & Scinto

(57) ABSTRACT

A load current flowing in a charger in a printer of electrophotographic system is detected through resistors, a masking process is performed to a differentiated part of a waveform of the load current, and then the obtained current is compared with a reference value. If the load current is norma, the masking process is performed to a peak portion of the differential waveform. However, if the load current is abnormal because of abnormal discharge or the like, the masking process is not performed to the peak portion of the differential waveform. Thus, in the latter case, since the load current is larger than the reference value, driving of the charger is temporarily stopped.

22 Claims, 7 Drawing Sheets

HIGH VOLTAGE POWER SUPPLY APPARATUS

BACKGROUND OF THE INVENTION

1. Field of the Invention

The present invention relates to protection of a high voltage power supply circuit.

2. Related Background Art

Generally, since a high voltage power supply apparatus used in an electrophotographic process allows potential adsorption and jumping phenomena for a toner, a circuit obtained by serially connecting an AC high voltage generation circuit and a DC high voltage generation circuit as shown in FIG. 7 is widely used. In an ordinary monocolor process (charge, development, transfer and cleaning), its current value is relatively small. That is, the value is equal to or lower than 1 mA in a DC high voltage, while the value is equal to or lower than 10 mA in an AC high voltage.

FIG. 7 shows the structure of a general current protection circuit in the high voltage power supply apparatus.

In FIG. 7, a drive circuit 100 acts as a complementary circuit of an emitter follower system having such the structure as emitters of transistors 101a and 101b are connected to each other. Numeral 102 denotes a coupling capacitor which is used in combining AC current. Numeral 103 denotes a high voltage transformer, and numeral 106 denotes an input terminal. Numeral 108 denotes an output terminal from which a high output voltage Vo is generated.

Numeral 120 denotes a protection circuit against an excessive current. Numerals 121 and 122 denote reference voltage generation units composed of ladder resistors for generating a reference voltage used in setting of the output voltage Vo. Numerals 123 and 124 denote detection resistors which detect the output voltage Vo. Numeral 125 denotes a comparator which compares the output voltage Vo detected by the detection resistors 123 and 124 with the reference voltage.

Numeral 130 denotes a bias circuit which generates the DC high voltage, numeral 131 denotes a switching transistor, numeral 132 denotes a flyback transformer, numeral 133 denotes a high voltage rectification diode, numeral 134 denotes a smoothing capacitor, and numeral 135 denotes a current detection resistor.

Numeral 140 denotes a detection circuit which detects abnormality at a load 200, and numeral 141 denotes a coupling capacitor which passes only an AC component out of high voltage current waveforms detected by the current detection resistor 135. Numeral 142 denotes a rectification circuit which rectifies the detected AC voltage, numeral 143 denotes a comparator which compares the detected current waveform with the reference voltage, and numerals 144 and 145 denote reference voltage generation units each of which is composed of a ladder resistor for generating the reference voltage. An output terminal of the comparator 143 is connected to an input terminal of the comparator 125 through a diode 151.

Operations of the circuits connected as above will be described.

A high voltage current from the output terminal 108 flows into the ground through the load 200. Then, a DC high voltage component feeds back to the smoothing capacitor 134 through the detection resistor 135. On the other hand, the AC component feeds back to an end of the transformer 103 through the smoothing capacitor 134.

The DC current and the AC current are overlapped and flow in the detection resistor 135 arranged in a series of current channels including the load 200. Thus, for example, when a limiter control is performed by detecting the AC current, an AC voltage component in the voltage detected by the resistor 135 is guided into the coupling capacitor 141 used in combining the AC current, whereby only the AC voltage component is detected. The AC voltage is rectified by the rectification circuit 142, and then compared with a divided voltage being a current limiter start voltage defined by the resistors 144 and 145, by the comparator 143.

However, as the current value to be supplied from the high voltage power supply apparatus to the load, e.g., it is sometimes required to supply a larger current value instead of the value equal to or less than 10 mA.

Hereinafter, a concrete example will be explained.

In a color printer or the like, after performing a monochrome development process on a photosensitive drum, at least two colors are synthesized on an intermediate transfer medium called as an intermediate transfer body by using a multiple transfer method. Then, a transfer bias is applied on a printing paper sheet to transfer the synthesized color the sheet. After then, a thermal fixing process is performed by a fixing unit to discharge the sheet. On the other hand, even if a toner on the intermediate transfer body is transferred to the sheet, several percents of toner remains on the body. In case of performing a print sequence for plural sheets, since the remained toner is accumulated one after another. Furthermore, since the accumulated toner is superimposed on following images, stain portions are formed on the image, whereby image quality is deteriorated.

For this reason, in a color process, a cleaning sequence for the intermediate transfer body using a cleaning unit is an extremely important technique.

The intermediate transfer body is generally formed as a belt or a cylinder having a resistive layer. The toner on the photosensitive drum is adsorbed to the body by applying a voltage bias from a high voltage generation unit. The cleaning unit supplies an electrical charge to the toner according to the high voltage generated by a cleaning high voltage power supply unit. After the toner is adsorbed on the photosensitive drum, a cleaning process is performed by a cleaning blade provided on the photosensitive drum.

Since the cleaning high voltage power supply unit uniformly supplies the electrical charge to the toner, a high DC bias voltage and a high AC voltage are required.

The intermediate transfer body is constructed by the resistive layer and a high insulating layer on its surface. In a case where the body contacts with a charge roller to charge it, a relatively large electrostatic capacity is generated between the body and the roller. Although a value of the capacity depends on a printer size, such the value is generally several hundreds of picofarads to 1000 pF. On the other hand, a cleaning high voltage is determined from a printer throughput and a print density, and intensive corona is necessary to charge the toner. For example, a waveform of 2 kHz, 80% duty and 3 kV is required as the waveform of enabling to sufficiently show cleaning capability. As the waveform of an output pulse, a response speed equal to or faster than $50V/\mu S$ is required. In order to apply such the output pulse waveform to the intermediate transfer body, a sufficiently lowered value is required for the output resistance of the high voltage power supply apparatus.

Almost every high voltage loads used in the electrophotographic process are electrostatic capacitors. Particularly, in the high voltage load or the like for cleaning, its flowing current of 90% or more is a current flowing in a dielectric load. On the other hand, in corona discharge and spark discharge between different electrodes and short-circuiting of the load, the flowing current of substantially 100% is an in-phase current flowing in a resistive component.

In a case where the load is a transfer body (i.e., charged member), electrically the load is an equivalent circuit of the capacitor. When the AC voltage is applied, a current corresponding to a known voltage change quantity flows. By such the dielectric current, a desired corona discharge is performed to the toner on the intermediate transfer body, and simultaneously a ground current is flowed through a basic layer (dielectric) of the transfer body itself. The flowing current is relatively large. That is, in case of an applied voltage having pulse waveform, the peak (i.e., peak value) of its current reaches several tens of milliamperes. In a case where an abnormal discharge current flows when a leak discharge is generated due to occurrence of an abnormality of the load such as transfer sheet winding around the intermediate transfer body, electrode short-circuiting or the like, it is frequently observed that such the abnormal discharge current has a relatively small value as compared with that of an ordinary load current of the transfer body.

For such the load abnormality, the above conventional high voltage power supply apparatus shown in FIG. 7 adopts a protection system of responding only to the excessive current by using the detection circuit 140, the protection circuit 120 and the like. However, in this protection system of responding only to the excessive current, it is impossible to practically protect the load. That is, although the high voltage power supply apparatus is protected, there sometimes occurs such a case as not detecting leak discharge (generally spark discharge) which is generated due to, e.g., the transfer sheet winding around the intermediate transfer body. This fact sometimes causes a damage to the apparatus.

As described above, the conventional high voltage power supply apparatus of low impedance has been realized. However, in the apparatus, spark energy at the leak discharge is high and a transitional current in the ordinary charge current reaches several tens of milliamperes. As a result, if the normal charge current is compared with the abnormal spark discharge current, there occurs such an inverted phenomenon as the absolute value of the normal charge current becomes larger than that of the spark discharge current. As above, there has been such a problem as the conventional apparatus for operating the protection circuit by observing only the detected current can not eliminate such the inverted phenomenon.

SUMMARY OF THE INVENTION

An object of the present invention is to provide a high voltage power supply apparatus for eliminating the above drawback.

Another object of the present invention is to provide a highly reliable high voltage power supply apparatus capable of protecting a load and a power supply unit and also maintaining security.

Still another object of the present invention is to provide a high voltage power supply apparatus for protecting the apparatus itself by stopping or decreasing a high voltage output according to a phase difference between a high voltage detection output flowing in the load and an AC high voltage output to be generated.

Still another object of the present invention is to provide a high voltage power supply apparatus for protecting the apparatus itself by stopping or decreasing a high voltage output according to comparison of in-phase components between a high voltage detection output flowing in the load and an AC high voltage output to be generated.

Other objects of the present invention will become apparent from the following description based on the attached drawings and the appended claims.

DETAILED DESCRIPTION OF THE PREFERRED EMBODIMENTS

The embodiments of the present invention will be explained in detail with reference to the attached drawings.

Figure 7:
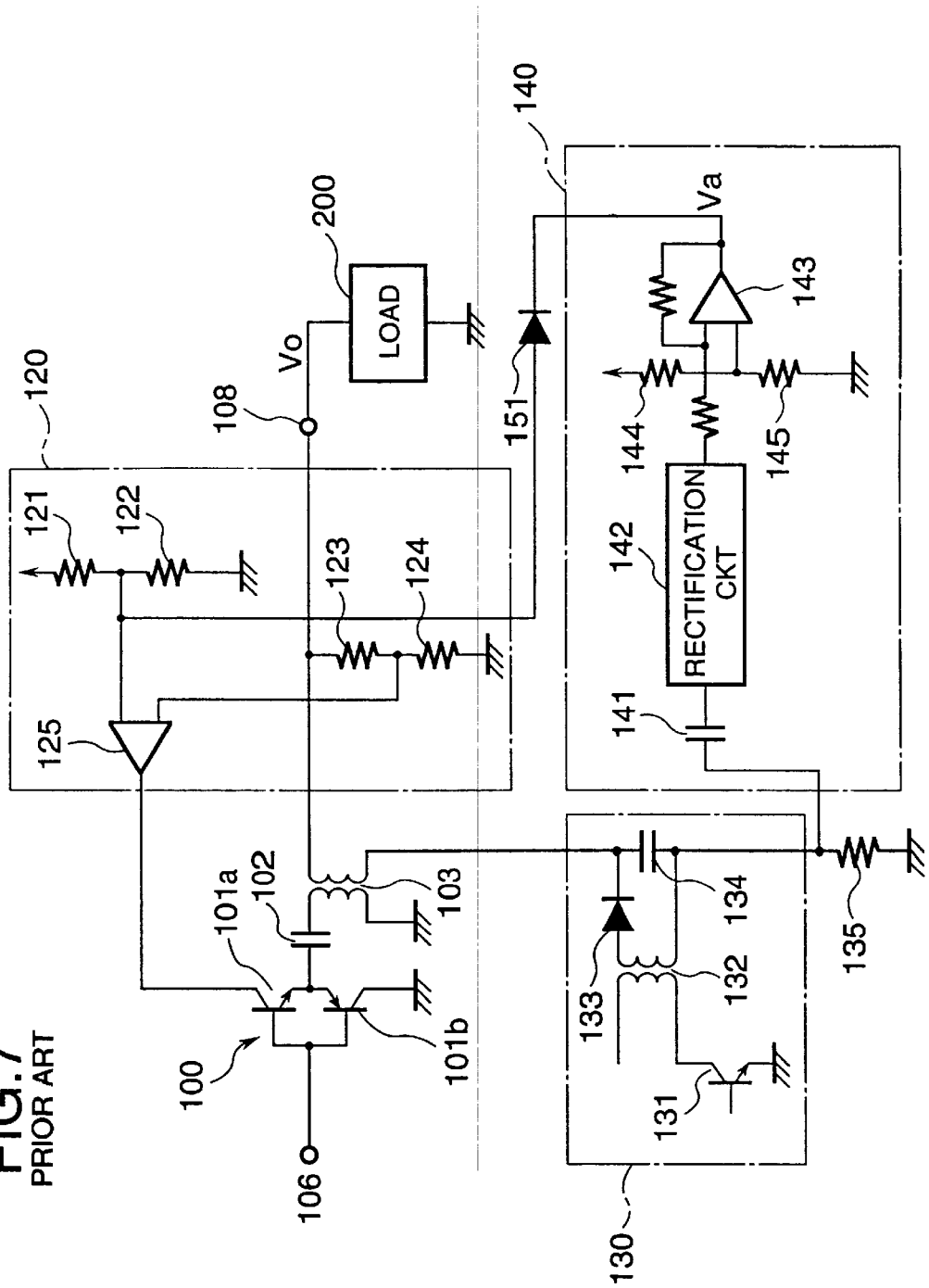
FIG. 7 is a circuit diagram showing the structure of a conventional high voltage power supply apparatus.

The first embodiment will be explained with reference to FIGS. 1 and 2A to 2E. It should be noted that the same parts as those in the conventional circuit (FIG. 7) are added with same numerals, and the descriptions thereof are omitted.

Figure 1:
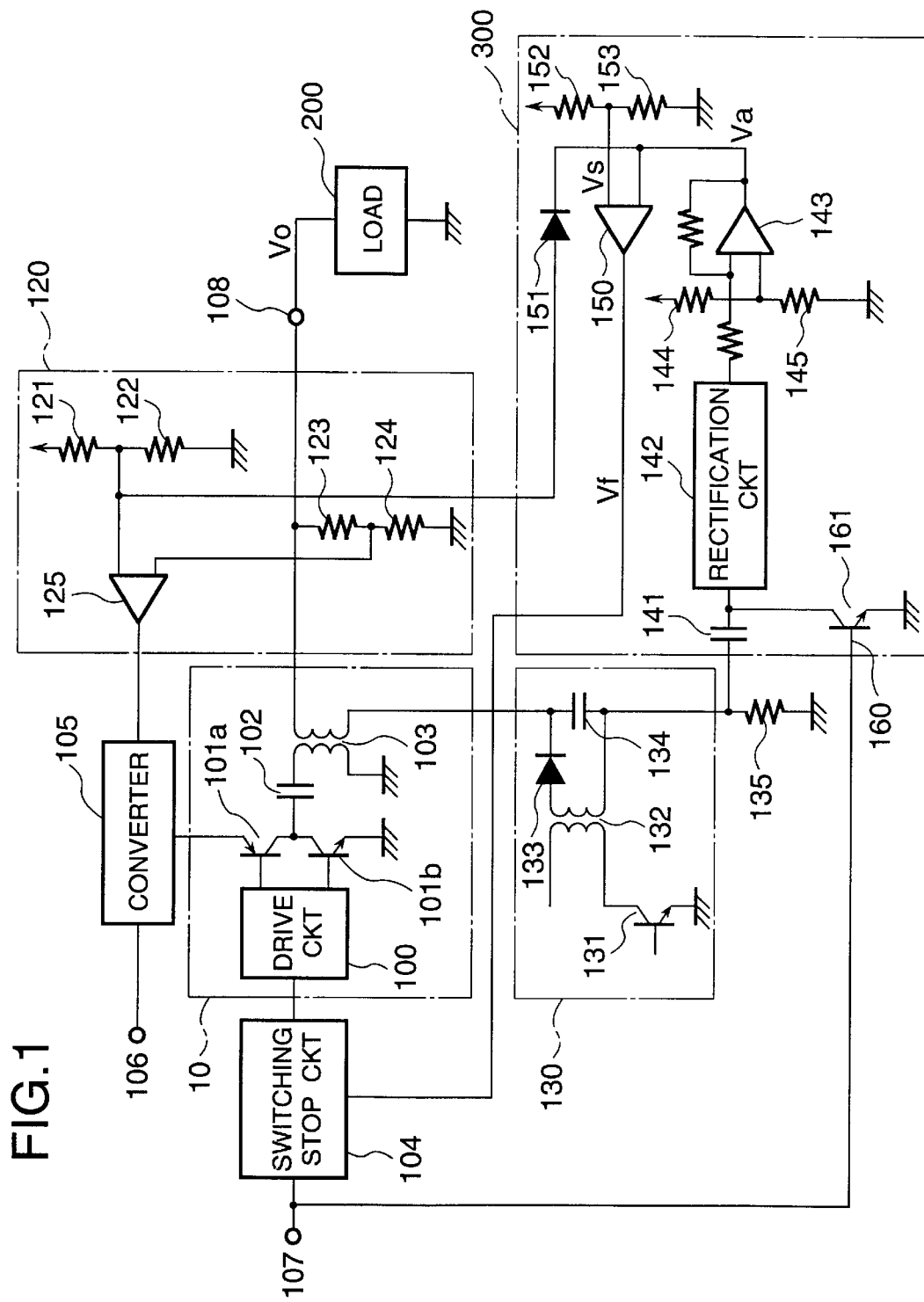
FIG. 1 is a circuit diagram showing the structure of a high voltage power supply apparatus according to a first embodiment of the present invention.

FIG. 1 shows the structure of a protection circuit in a high voltage power supply apparatus according to the present invention. The protection circuit can be provided in a color printer acting as, e.g., the conventional image formation apparatus.

A drive circuit 100, which is not based on a conventional emitter follower system, is a complementary circuit of a collector output system having the structure that collectors of transistors 101a and 101b are combined each other, numeral 102 denotes a coupling capacitor for AC coupling, numeral 103 denotes a high voltage transformer, numeral 104 denotes a switching stop circuit of the drive circuit 100, numeral 105 denotes a variable output converter, numeral 106 denotes an input terminal, and numeral 107 denotes a switching signal input terminal. Numeral 108 denotes an output terminal from which a high output voltage Vo is generated.

Numeral 300 denotes an AC current detection circuit which constructs the main circuit of the present invention. A high voltage generation unit 10 which is composed of the complementary circuit generates the high output voltage Vo as a collector output type. It is structured that a power voltage supplied to a switching circuit of the high voltage generation unit 10 is variable according to a feedback voltage Vf fed back by the AC current detection circuit 300.

Numeral 150 is a comparator connected to the switching stop circuit 104, numeral 151 denotes a diode connected between an input terminal of a comparator 125 and an input terminal of the comparator 150, and numerals 152 and 153 denote reference voltage generation units composed of ladder resistors for generating a reference voltage.

An output voltage target value Vs being a divided voltage at the reference voltage generation units 152 and 153 and a value obtained by attracting a detection voltage Va at a comparator 143 by the diode 151 are inputted to the comparator 150. As above, when the detection voltage Va is zero, a target voltage determined by resistors 121 and 122 is attracted by the diode 151 and the target voltage to be inputted to the comparator 125 is lowered, thereby lowering or stopping the high output voltage Vo.

Numeral 160 denotes a switching signal input circuit composed of a transistor connected between the input terminal 107 to which a switching signal is inputted and an input side of a rectification circuit 142, and numeral 161 denotes a switching element. The switching signal input circuit 160 performs an operation for making only an edge in-phase component of detection current waveform effective in response to the switching signal to be inputted.

By providing such the circuit structure, the complementary circuit in the high voltage generation unit 10 can perform a switching operation, thereby enabling to perform the switching operation such that a saturated voltage becomes extremely low.

The high output voltage Vo is generated by the high voltage generation unit 10. Furthermore, the voltage generated at a detection resistor 135 serially connected to a current channel including a load 200 is detected by the detection circuit 300. Then, a phase of an AC detection current waveform detected by the detection circuit 300 is compared with that of an output AC voltage waveform. If an in-phase component value is large, i.e., if a load power ratio is in a high level, it is controlled to operate that the high output voltage Vo at the high voltage generation unit 10 is decreased or stopped.

Subsequently, the actual operation of the circuit will be explained.

If the power voltage is supplied to the input terminal 106, the converter 105 converts the voltage according to a switching operation and supplies the converted voltage to the transistors 101a and 101b in the drive circuit 100 as the power. The drive circuit 100 is driven with a switching signal of frequency 2 kHz and duty ratio 80%. The drive circuit 100 sufficiently supplies base currents to the transistors 101a and 101b to cause these transistors to operate in a saturated switching state, thereby minimizing a loss and lowering output impedance.

The switched signal excites a primary winding in the boosting transformer 103 through the coupling capacitor 102. Consequently, a boosted voltage waveform proportional to the number of turns of a secondary winding in the transformer 103 can be obtained to output the high output voltage Vo to the output terminal 108. The high output voltage Vo is divided by voltage detection resistors 123 and 124 and compared with the reference voltage defined at resistors 116 and 117 by the comparator 125. According to the compared result, a supplying voltage at the converter 105 for supplying the power to a switching unit is varied, thereby controlling the high output voltage Vo to have a target value.

On the other hand, a bias circuit 130 constructed by elements 131 to 134 as a high voltage DC converter is connected to an edge of the secondary winding in the transformer 103, and is grounded through the detection resistor 135. Therefore, all the current flowing from the output terminal 108 through the high voltage load 200 flow in the detection resistor 135. Consequently, at both edges of the detection resistor 135, a current waveform according to DC and AC components of the current flowing in the load 200 is detected as a voltage waveform.

In the present embodiment, for example, the intermediate transfer body, i.e., the conventional charged member is used as the load 200. In this case, the load 200 is an equivalent circuit of capacitor. Thus, when an AC voltage is applied thereto, a current corresponding to the known voltage change quantity flows. By such the dielectric current, a desired corona discharge is performed to a toner on the intermediate transfer body. At the same time, a ground current is flowed thereinto through a basic layer (dielectric) of the transfer body itself. The value of the flowing current is relatively large. That is, in a case where the applied voltage has the pulse waveform, a peak value of the current reaches several tens of milliamperes. Here, in a case where an abnormal discharge current flows when a leak discharge is generated due to occurrence of an abnormality of the load such as transfer sheet winding around the intermediate transfer body, electrode short-circuiting or the like, it is frequently observed that such the abnormal discharge current has a relatively small value as compared with that of an ordinary load current of the transfer body.

Therefore, it is proposed the circuit to judge a normal load state and an abnormal load state with use of the detection circuit 300 when the AC voltage Vo is applied to a dielectric load.

Only the AC component of the voltage detected by the detection resistor is detected by a coupled capacitor 141 connected to the detection resistor 135. At this time, a masking operation to make effective only an edge in-phase component of the voltage waveform of AC component detected responding to the switching signal to be inputted is performed by the switching signal input circuit 160. A peak value of the detected voltage waveform is converted into a DC voltage value by the half-wave rectification circuit 142, and the converted voltage value is compared with the reference voltage defined at resistors 144 and 145 in an amplifier 143. If this voltage value exceeds the reference voltage, the voltage Va for controlling an output voltage is decreased by the diode 151. At the same time, an input signal is immediately interrupted by the comparator 150 to stop the output from the high voltage generation unit 10.

By performing such an operation, for example, when the load 200 is short-circuited or the load 200 generates a spark discharge by occurrence of insulation destruction due to some trouble, it is possible to surely detect the abnormal discharge. Therefore, it is possible to previously prevent paper sheet destruction, equipment destruction and a CPU erroneous operation or the like due to the spark discharge.

FIGS. 2A, 2B, 2C, 2D and 2E comparatively show waveforms of the respective units in a case where the load 200 is a dielectric (i.e., capacitive load) and a case where the load 200 is a resistive load (including spark discharge).

Figure 2A:
FIGS. 2A, 2B, 2C, 2D and 2E are waveform views showing signal waveforms in respective units.
Figure 2B:
Figure 2C:
Figure 2D:
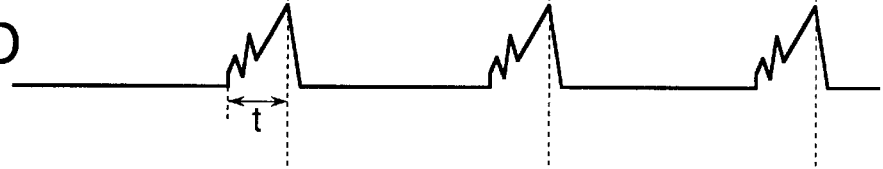
Figure 2E:

FIG. 2A shows a waveform of the output voltage Vo. FIG. 2B shows a waveform of an ordinary charge current when the load 200 is in a normal state, that is, in a case where the load is a dielectric load (capacitive load). FIG. 2C shows a pulse voltage waveform of the switching signal to be inputted to the switching signal input circuit 160. FIG. 2D shows a waveform of a charge current which flows due to occurrence of the leak discharge or a shortening when the load 200 is in an abnormal state, that is, in a case where the load is the resistive load. FIG. 2E shows a voltage waveform obtained after the masking operation (i.e., process for delaying signal detection timing) is performed to the waveform shown in FIG. 2D by the switching signal input circuit 160.

In respect of the waveform of the charge current at the time when the load 200 is in a normal state, a large current is generated at a change point of the pulse voltage waveform. On the other hand, in respect of the waveform of the charge current at the time when the load is in an abnormal state, the leak discharge is spread after a pulse voltage is applied. Thus, the waveform curve is given to represent that the current gradually increases from a corona leak, breaks down and then rapidly increase. As apparent from the compared result of these waveforms of the charge currents, phases are different.

Therefore, by attracting attention to a phase difference between a waveform of a load voltage and the waveform of the charge current at the time when the load is in the abnormal state, the phase difference and its magnitude are detected judgement standards. In order to perform such the detection, the pulse voltage waveform of pulse width t is inputted to a switching element 161 of the circuit 160 to perform a switching operation, whereby a masking process for the waveform of the charge current in the abnormal state shown in FIG. 2D is performed. Thus, a voltage trailing edge portion is extracted from the charge current waveform being in spark leak discharging. FIG. 2E shows a waveform obtained by extracting only the voltage trailing edge portion. Subsequently, the obtained waveform is rectified by the rectification circuit 142, converted into the DC voltage value, and then subjected to a limiter operation by the comparator according to its magnitude.

In a case where the charge current flows based on the normal load (dielectric), the detection waveform can not be obtained through the rectification circuit 142 and the comparator 150 because the masking is performed by using the waveform shown in FIG. 2B, whereby any limiter operation is not performed resultingly.

As above, in the circuit according to the present embodiment, the limiter operation is not performed based on only such the load current value as in the conventional circuit. That is, the load in the abnormal state is discriminated by juding the phase and magnitude of the current waveform, and the limiter operation is then performed based on such discrimination, whereby it is possible to adequately grasp the state of the load. Consequently, it is possible to judge that the load is the spark discharge, the corona discharge or the load short-circuiting, if a large in-phase component is observed by comparing phases of the detected current waveform. Furthermore, it is possible to judge that the load is in the normal state, if the current phase is progressive to the voltage.

Furthermore, in case of the cleaning load as in the conventional apparatus, since impedance of a power supply unit is designed to have a low value to secure the detected waveform, a dielectric current of the load becomes large, and the absolute value of the current sometimes exceeds the corona leak or the spark leak generated when the load is in the abnormal state. Therefore, by comparing the phases of the above waveforms, it is possible to accurately judge abnormality of the load, thereby realizing to provide a protection circuit of the high voltage power supply apparatus which can maintain a protection of the load, a protection of the power supply unit and security.

Subsequently, the second embodiment of the present invention will be described with reference to FIGS. 3, 4A, 4B, 4C, 4D and 4E. The explanations of the same parts as those in the first embodiment are omitted.

Figure 3:
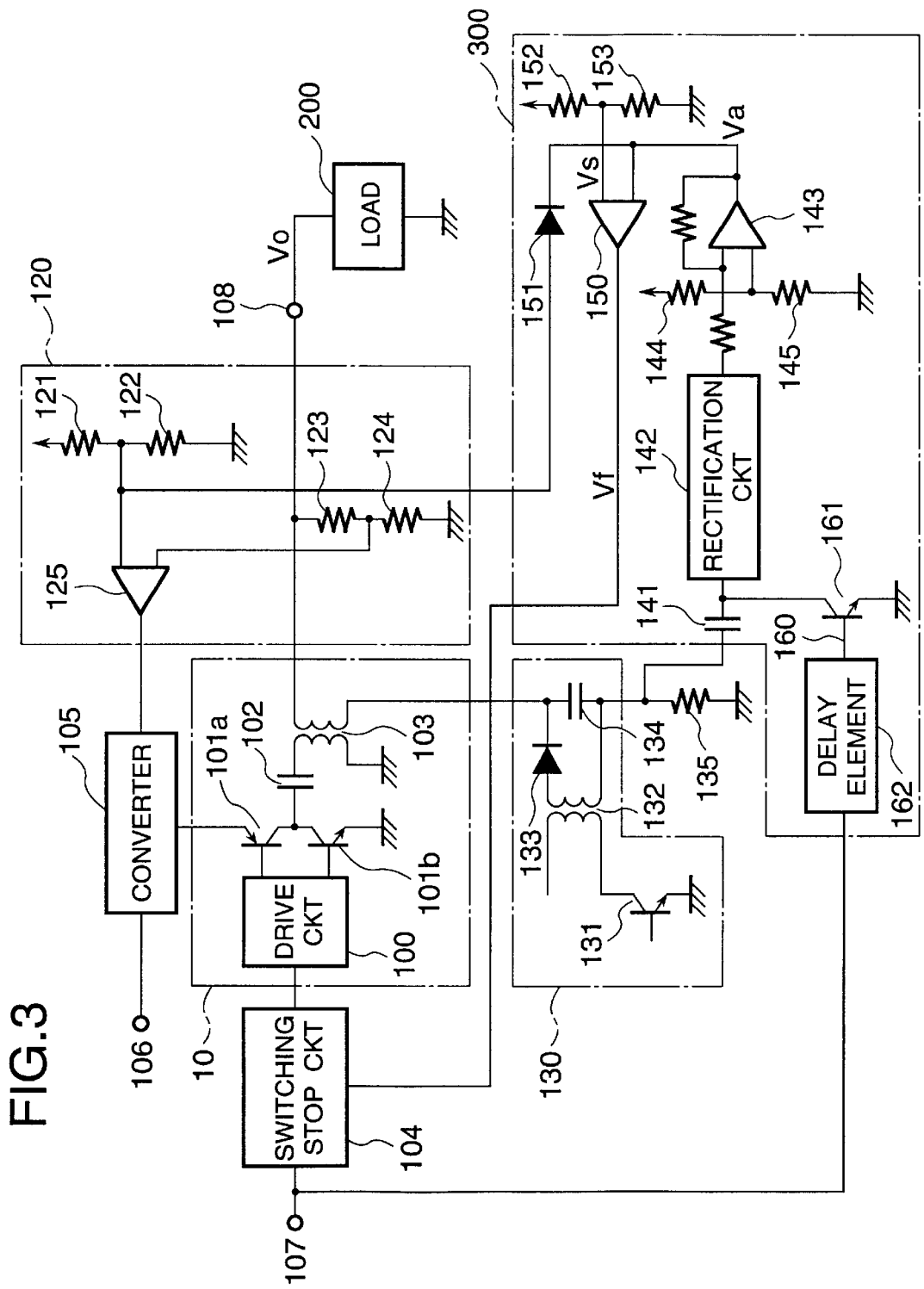
FIG. 3 is a circuit diagram showing the structure of a high voltage power supply apparatus according to a second embodiment of the present invention.

As shown in FIG. 3, in the present embodiment, a delay element 162 having a signal inversion function and a delay function is provided in the switching signal input circuit 160 at the detection circuit 300. The delay element 162 has the delay function for inverting level of the switching signal to be inputted to delay the switching signal for a certain time so as to perform the masking operation by using the delayed switching signal.

Figure 4A:
FIGS. 4A, 4B, 4C, 4D and 4E are waveform views showing signal waveforms in respective units.
Figure 4B:
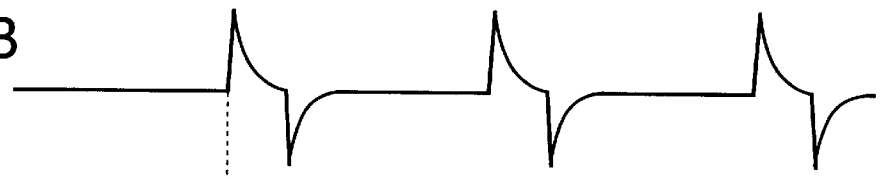
Figure 4C:
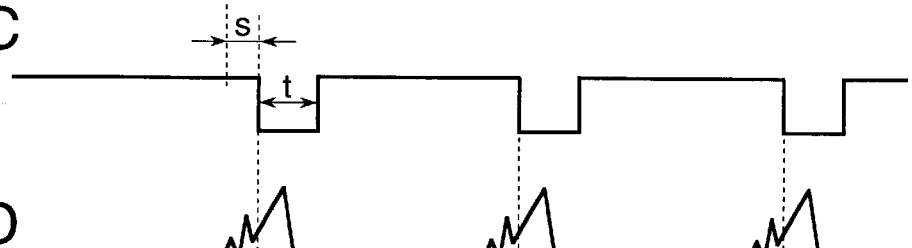
Figure 4D:
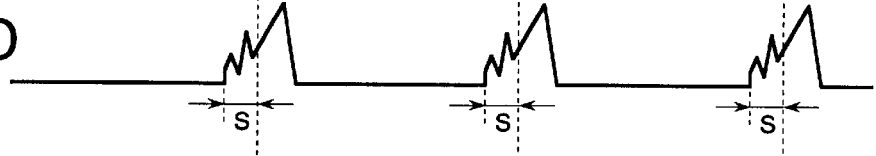

A waveform shown in FIG. 4C indicates a pulse signal waveform after the pulse signal passes through the delay element 162. In this case, a delay time S is set to be shorter than the pulse width t.

Figure 4E:

As above, by performing waveform inversion and setting the delay time, current detection is possible at an area apart from a transitional position being a change point of the pulse voltage waveform. FIG. 4E shows a voltage waveform obtained after performing the masking process. Then, the voltage waveform after the masking process is performed is inputted to the comparator 143, and compared with the reference voltage being divided at the resistors 144 and 145. If the compared voltage waveform exceeds the reference voltage, the limiter operation is performed to the high voltage generation unit 10 through the comparator 150.

As described above, the load abnormality is accurately judged by comparing waveform phases of the detection currents between normal and abnormal states. Therefore, especially in a color printer manufactured in recent years, since there are needs to perform multicolor synthesizing on the transfer body itself and make throughput faster, it is required to increase the high voltage output more and more. In such a situation, even if it occurs a inversion phenomenon that the absolute value of the load current in the normal state is larger than that of the spark discharge in the abnormal state, the circuit according to the present embodiment is extremely effective as the protection circuit of the high voltage power supply.

Subsequently, the third embodiment of the present invention will be explained with referent to FIGS. 5, 6A, 6B, 6C, 6D and 6E. The explanations of the same parts as those in the first and second embodiments are omitted.

In the present embodiment, a following system to limit a current of the load 200 is provided. That is, in order to detect whether or not the load 200 is normal, a pseudo current of the normal load current is generated, and subjected to the voltage conversion. Then, the obtained pseudo current is compared with an actual load current to judge the state of the load.

Figure 5:
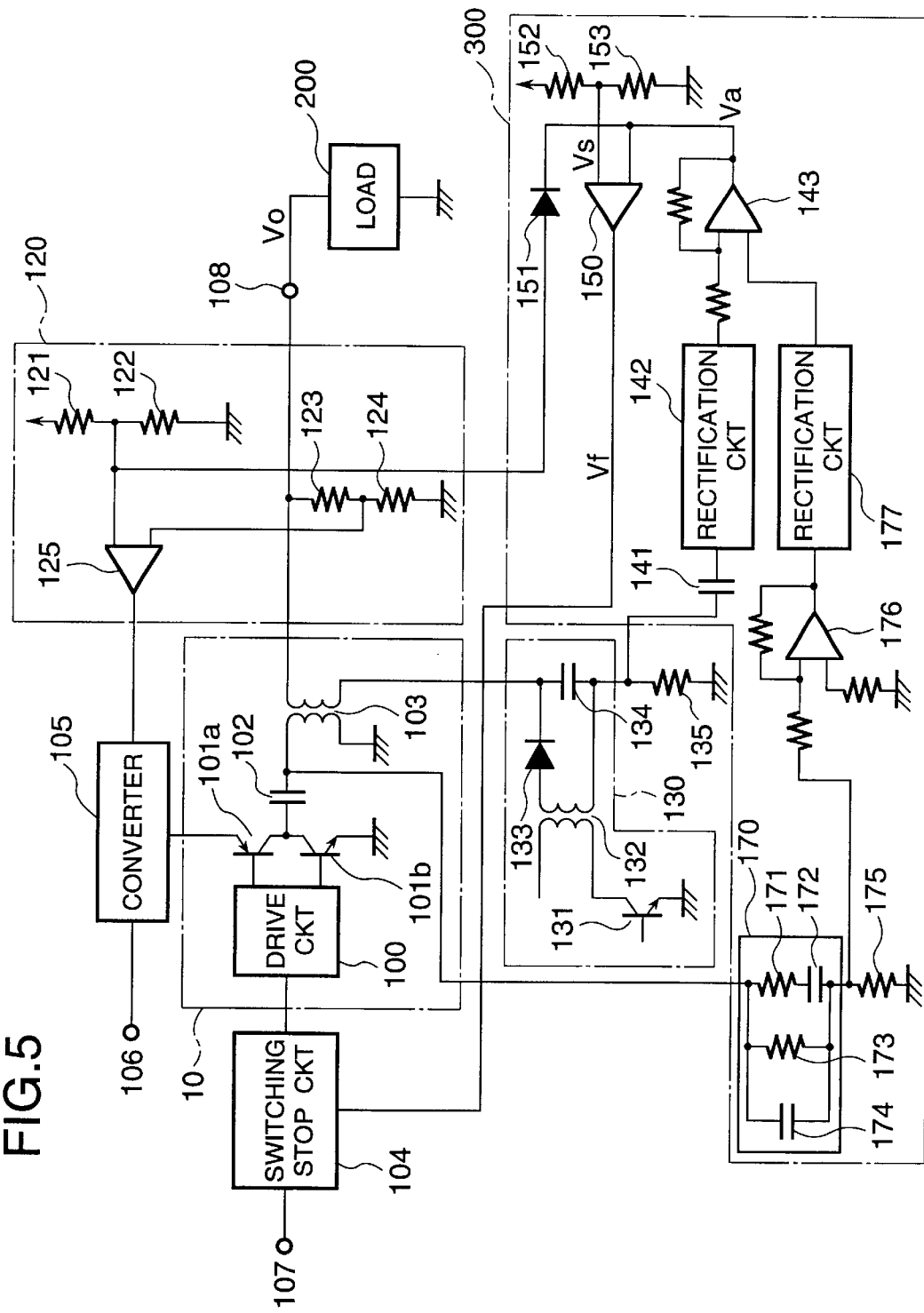
FIG. 5 is a circuit diagram showing the structure of a high voltage power supply apparatus according to a third embodiment of the present invention.

In FIG. 5, the drive circuit 100 supplies the output voltage Vo to the transfer body being the load 200. Also, the circuit 100 simultaneously supplies the voltage to a pseudo load circuit 170.

The pseudo load circuit 170 has the value which is obtained by correcting the circuit constant from an equivalent circuit of the transfer body in accordance with the squared product of turn ratio of the transformer 103, and can be composed of resistors 171 and 173 and capacitors 172 and 174. In this case, the value of the resistor 171 corresponds a workload to the toner, the value of the capacitor 172 corresponds to an electrostatic capacity of dielectric layer contained in the structure of the transfer body, the value of the resistor 173 corresponds to a representative value of floating capacities of terminals and structures, and the value of the capacitor 174 corresponds to a leak current value. Furthermore, the equivalent circuit is formed in the method for rotating the objective transfer body at a certain rotational number, applying a certain high voltage to the body, and calculating each constant from the current waveform flowing at this time.

Numeral 175 denotes a detection resistor for detecting the pseudo current flowing from the pseudo load circuit 170, numeral 176 denotes an inversion amplifier, and numeral 177 denotes a rectification circuit. An output from the rectification circuit 177 is inputted to the comparator 143 together with an output from the rectification circuit 142.

Subsequently, the operation of the circuit according to the present embodiment will be explained.

The output voltage from the drive circuit 100 is applied to the transfer body being an actual load from the output terminal 108 after boosting the voltage. Also, a similar voltage waveform is applied to the pseudo load circuit 170. Thus, the pseudo current of which waveform is identical with that of the load current flows at the detection resistor 175, and is subjected to the voltage conversion.

The actual load current from the output terminal 108 flows as the load current. Such the load current flows at the detection resistor 135 through the ground, and is fed back to the high voltage AC transformer 103 through a DC bias transformer 132 and a high voltage rectification diode 133.

Figure 6A:
FIGS. 6A, 6B, 6C, 6D and 6E are waveform views showing signal waveforms in respective units.
Figure 6B:
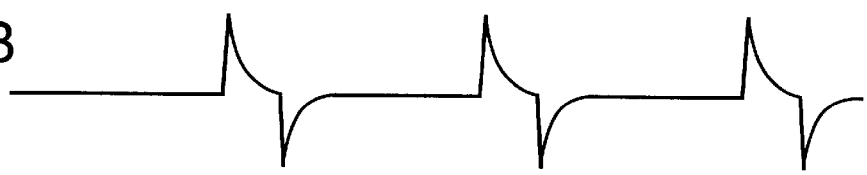
Figure 6C:
Figure 6D:
Figure 6E:

FIG. 6C shows a waveform of a pseudo load current, FIG. 6D shows a waveform of a current detected by the detection resistor 135 when the load is in the abnormal state (actual line), and FIG. 6E shows a waveform of an output voltage from the comparator 150.

The waveform of the current detected by the detection resistor 135 is inverse to that of the high output voltage. On the other hand, since it is structured that the pseudo load current flowing through the pseudo load circuit 170 is directly flowed into the detection resistor 175, any inversion does not occur between the voltage and current waveforms. Therefore, in order to correlate the pseudo load current with the actual load current to which inverted detection is performed, the pseudo load current is drawn to the inversion amplifier 176, and its output is further drawn to the rectification circuit 177 equivalent to the rectification circuit 142. Then, the actual load current is compared with the pseudo load current by the comparator 143. If the waveform of the actual load current is different from that of the pseudo load current, it is judged that the load is abnormal, and thus the output signal is transmitted to the switching stop circuit 104 being a limiter circuit through the comparator 150. As above, since an intermittent operation is caused by decreasing and shutting down the output, it becomes possible to protect the high voltage circuit and also protect the load 200.

The present invention is not limited to the above embodiments. That is, various modifications are possible within the spirit and scope of the appended claims.

What is claimed is:

1. A high voltage power supply circuit which supplies an AC high voltage to an electrifier for electrifying an image support body for image formation, said circuit comprising:
   a transformer;
   a switching circuit for performing switching of a primary-side drive of said transformer;
   detection means for detecting a state of a secondary side of said transformer, wherein said detection means detects when a secondary-side state of said transformer changes due to one of on-to-off switching and off-to-on switching by said switching circuit but does not substantially change due to the other of on-to-off switching and off-to-on switching by said switching circuit; and
   judgment means for judging whether or not an abnormality occurs on the basis of a result detected by said detection means.

2. A circuit according to claim 1, wherein said detection means contains a current detection circuit for detecting a current flowing through the secondary side of said transformer.

3. A circuit according to claim 1, wherein said judgment means contains a circuit for comparing a value detected by said detection means with a reference value.

4. A circuit according to claim 1, further comprising a protection circuit for stopping or decreasing supply of the AC high voltage on the basis of a judgment of said judgment means.

5. A circuit according to claim 1, wherein said detection means contains a circuit for performing masking to detect the secondary-side state of said transformer during a posterior period at a timing close to at least one of on-to-off switching and timing of off-to-on switching by said switching circuit.

6. A circuit according to claim 1, further comprising a control circuit for controlling the output AC high voltage so that it becomes a target value.

7. A circuit according to claim 6, further comprising a protection circuit for decreasing the target value on the basis of a judgment of said judgment means.

8. A circuit according to claim 1, wherein said detection means contains a masking signal generation circuit for generating a signal to perform masking to detect the secondary-side state of said transformer during a posterior period at a timing close to at least one of on-to-off switching and off-to-on switching by said switching circuit, on the basis of a signal for the switching by said switching circuit.

9. A circuit according to claim 8, wherein said masking signal generation circuit contains a delay circuit for delaying the signal for the switching by said switching circuit.

10. A circuit according to claim 1, wherein said detection means contains a first detection circuit for detecting the secondary-side state of said transformer, a pseudo load circuit including a circuit with a load and an impedance that is similar to the load, and a second detection circuit for detecting a state of said pseudo load circuit, and wherein
   said detection means detects that the secondary-side state changes due to one of on-to-off switching and off-to-on switching by said switching circuit, but does not substantially change due to the other of on-to-off switching and off-to-on switching by said switching circuit, by comparing a result detected by said first detection circuit with a result detected by said second detection circuit.

11. A circuit according to claim 2, wherein said detection means detects when the current that said current detection circuit detects flows in the same direction due to the one of the on-to-off switching and the off-to-on switching and due to the other of the on-to-off switching and the off-to-on switching.

12. An abnormality detection method which is used in a high voltage power supply circuit supplying an AC high voltage to an electrifier electrifying an image support body for image formation, said method comprising:
   a detection step of detecting a secondary-side state of a transformer of which primary-side drive is subjected to switching by a switching circuit, wherein said detection step detects when a secondary-side state of the transformer changes due to one of on-to-off switching and off-to-on switching by the switching circuit, but does not substantially change due to the other of on-to-off switching and off-to-on switching by the switching circuit; and
   a judgement step of judging whether or not an abnormality occurs on the basis of a result detected in said detection step.

13. A method according to claim 12, wherein, in said detection step, a current flowing through a secondary side of the transformer is detected.

14. A method according to claim 12, wherein said judgment step includes a step of comparing a value detected in said detection step with a reference value.

15. A method according to claim 12, further comprising a protection step of stopping or decreasing supply of the AC high voltage on the basis of a judgment in said judgment step.

16. A method according to claim 12, wherein said detection step includes a step of performing masking to detect the secondary-side state of the transformer during a posterior period at a timing close to at least one of on-to-off switching and timing of off-to-on switching by the switching circuit.

17. A method according to claim 12, further comprising a control step of controlling the output AC high voltage so that it becomes a target value.

18. A method according to claim 17, further comprising a protection step of decreasing the target value on the basis of a judgment in said judgment step.

19. A method according to claim 12, wherein, in said detection step, a masking signal is generated by a masking signal generation circuit to perform masking to detect the secondary-side state of the transformer during a posterior period at a timing close to at least one of on-to-off switching and of off-to-on switching by the switching circuit, on the basis of a signal for the switching by the switching circuit.

20. A method according to claim 19, wherein the masking signal generation circuit contains a delay circuit for delaying the signal for the switching by the switching circuit.

21. A method according to claim 12, wherein said detection step detects the secondary-side state of the transformer, detects a state of a pseudo load circuit including a circuit with a load and an impedance that is similar to the load, and compares a detection result of the secondary-side state of the transformer with a detection result of the state of the pseudo load circuit, whereby said detection step detects that the secondary-side state changes due to one of on-to-off switching and off-to-on switching by the switching circuit, but does not substantially change due to the other of on-to-off switching and off-to-on switching by the switching circuit.

22. A circuit according to claim 13, wherein said detection step detects when the current flows in the same direction due to the one of the on-to-off switching and the off-to-on switching and due to the other of the on-to-off switching and the off-to-on switching.

* * * * *

UNITED STATES PATENT AND TRADEMARK OFFICE
CERTIFICATE OF CORRECTION

PATENT NO. : 6,229,721 B1
DATED : May 8, 2001
INVENTOR(S) : Hiroshi Mano et al.

It is certified that error appears in the above-identified patent and that said Letters Patent is hereby corrected as shown below:

Title page,
Item [57] ABSTRACT, "norma," should read -- normal, --.

Column 2,
Line 20, "color" should read -- color to --.
Line 24, "percents" should read -- percent --.
Line 50, "the" should be deleted.
Line 59, "the" should be deleted.

Column 3,
Line 18, "the" should be deleted.
Line 22, "the" ($1^{st}$ occurrence) should read -- a --.
Line 45, "current" should read -- current which --.
Line 46, "the" should read -- an --.

Column 4,
Line 42, "combined" should read -- combined to --.

Column 5,
Line 15, "the" ($1^{st}$ occurrence) should read -- a --.
Line 39, "currents" should read -- current --.

Column 6,
Line 4, "the" should read -- a --.
Line 16, "the" should read -- an --.
Line 19, "proposed" should read -- proposed that --.
Line 20, "with" should read -- with the --.

Column 7,
Line 12, "the" should read -- a --.
Line 26, "can not" should read -- cannot --.
Line 33, "the" ($1^{st}$ occurrence) should read -- a --.

UNITED STATES PATENT AND TRADEMARK OFFICE
CERTIFICATE OF CORRECTION

PATENT NO. : 6,229,721 B1
DATED : May 8, 2001
INVENTOR(S) : Hiroshi Mano et al.

It is certified that error appears in the above-identified patent and that said Letters Patent is hereby corrected as shown below:

Column 8,
Line 53, "sponds" should read -- sponds to --.

Column 9,
Line 13, "the" (2nd occurrence) should read -- a --.

Signed and Sealed this

Fifteenth Day of January, 2002

Attest:

JAMES E. ROGAN
*Director of the United States Patent and Trademark Office*

*Attesting Officer*